(No Model.)

J. BUTCHER.
CYCLOMETER.

No. 357,758. Patented Feb. 15, 1887.

WITNESSES:
E. B. Bolton
Frank Moulin

INVENTOR:
Joseph Butcher
By his Attorney,
Henry Connell

N. PETERS, Photo-Lithographer, Washington, D. C.

United States Patent Office.

JOSEPH BUTCHER, OF BOSTON, MASSACHUSETTS.

CYCLOMETER.

SPECIFICATION forming part of Letters Patent No. 357,758, dated February 15, 1887.

Application filed July 8, 1886. Serial No. 207,401. (No model.)

*To all whom it may concern:*

Be it known that I, JOSEPH BUTCHER, a citizen of the United States, and a resident of Boston, Suffolk county, Massachusetts, have invented certain new and useful Improvements in Cyclometers, of which the following is a specification.

My invention relates to improvements in gravity-hub cyclometers of the kind illustrated and described in my patent, No. 270,737, dated January 16, 1883; and the object of the invention is to provide in this class of cyclometers an improved mechanism for transmitting movement to the train of registering mechanism, and also to provide an improved packing for the housing which embraces the axle or hub-spindle of the velocipede-wheel.

In my present invention the driver of the train of the registering mechanism is a toothed wheel, with which meshes a screw or worm. This screw or worm rotates in suitable bearings, and is prolonged to pass through a stuffing-box on the side of the hermetically-closed case and into the hollow of the clamp or housing that embraces the wheel-axle. On its end is what I call a "turnstile"—that is to say, there is a hub with several radially-projecting arms, preferably four. On the axle, or on a sleeve borne by the axle, by preference, is a stud or projection, which is so set that at each revolution of the axle this stud engages one arm of the turnstile and moves it out of its path, thus imparting to the driving screw or worm a partial revolution.

In order that my cyclometer complete may be mounted on the axle of any vehicle-wheel—usually on the suspension-wheel of a velocipede—I prefer to make a sleeve, bearing the stud, in two halves or sections, so that it may be clamped and fastened securely on the axle by any one; and in order to lessen the friction I prefer to mount a bowl rotatively on the stud that engages the turnstile. When the turnstile has four arms, it will be obvious that it will require four revolutions of the axle to produce one revolution of the screw or worm.

Figure 1:
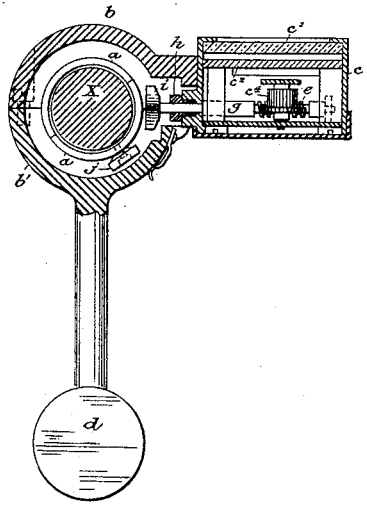
Figure 2:
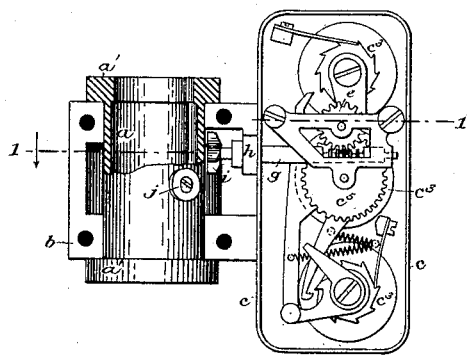
Figure 3:
Figure 4:
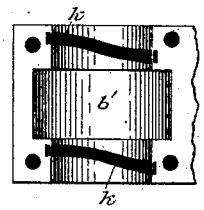
Figure 5:
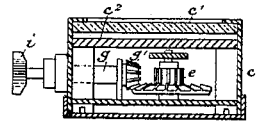

In the drawings, which serve to illustrate my invention, Figure 1 is a transverse section taken through the case, registering mechanism, and attaching clamp or housing of a cyclometer embodying my invention. The plane of the section is indicated by line 1 1 in Fig. 2. Fig. 2 is an under side view, from which the back cap of the movement-case and the lower section of the clamp or housing and part of the sleeve have been omitted. Fig. 3 is a diagram showing the turnstile in front elevation, and designed to illustrate the manner in which the actuating-stud operates to rotate it. Fig. 4 is a view of one of the sections of the housing $b'$, showing grooves $k$ to receive plumbago. Fig. 5 illustrates a modification that will be hereinafter described.

X in Fig. 1 represents the axle of the vehicle-wheel, which may be the axle of a suspension-wheel of a bicycle. On this axle are clamped the two sections or halves $a$ $a$ of the sleeve. Embracing this sleeve are the two sections $b$ $b'$ of the cyclometer clamp or housing, which are or may be secured together by screws. To the upper section, $b$, is attached the cyclometer-case $c$, and to the lower section is attached the counterbalance or weight $d$. The cyclometer-clamp, while fitting quite snugly on the sleeve, is rotatable thereon, or rather the sleeve and axle may rotate freely within the clamp. The weight $d$ keeps the cyclometer from rotating, and flanges $a'$ $a'$ on the sleeve embrace the cyclometer-clamp endwise and prevent any lateral movement thereof.

The cyclometer-case and its inclosed train, dial, disks, and ratchets are substantially the same, or may be substantially the same, as those described in my former patent, No. 270,737, and will not require any special description here. I will only say that $c$ represents the hermetically-closed case, $c'$ the glass covering the dial-plate, $c^2$ the dial-plate, and $c^3$ the disks carrying the tens, hundreds, and thousands digits or numerals which appear through apertures in the dial-plate. The units are indicated by an index or hand on the dial. Any registering mechanism may, however, be employed.

In my former patent I showed a mechanism for transmitting the revolutions of the axle to the train of registering mechanism, consisting of a cam carried by the axle-sleeve and a pawl actuated by said cam, which engaged a ratchet-wheel forming the driving-wheel of the train. I now substitute for this the mechanism I will describe.

$e$ is a toothed wheel which forms the driving-wheel of the registering-train, a pinion, $c^4$, on its axis meshing with the toothed wheel $c^5$. The teeth of this wheel $e$ engage with the threads on a screw, $g$, which extends horizontally across the case $c$, and is rotatively mounted in suitable bearings therein. One end of this screw projects out through the wall of the case $c$, and its bearings at this point are provided with a stuffing-box, $h$. This box is to prevent water from entering the cyclometer-case at the point where the worm or the screw-spindle passes out.

On the projecting end of the screw-spindle is fixed the turnstile $i$, (seen in front elevation in Fig. 3,) which stands in a recess formed in the cyclometer clamp or housing. On the axle-sleeve $a$ $a$ is fixed a stud, $j$, in such a position that when the axle and sleeve rotates this stud will find an arm of the turnstile $i$ in its path, and will move said arm out of its path, thus effecting a partial revolution of the screw $g$.

Fig. 3 illustrates the operation of this device. I usually form the stud $j$ of a screw screwed tightly into the sleeve, and carrying a loose bowl or roller which acts on or impinges against the arm of the turnstile.

In order to form an anti-friction or lubricating surface where the sections $b$ $b'$ of the clamp or housing bear on the sleeve $a$ $a$, I form a groove or grooves, $k$, preferably helically arranged in the inner faces of the clamp-sections, and fill this groove with plumbago mixed with shellac, or plumbago alone, or plumbago mixed with some other substance—as mucilage, for example—similar to shellac. This is clearly shown in Fig. 4. I may form the grooves $k$ by cutting a shallow square screw-thread in $b'$.

A hub-lamp may be substituted for the weight $d$, if preferred. In lieu of the screw-thread or worm meshing with teeth on the wheel $e$, I might employ a bevel-pinion on the shaft or spindle to mesh with teeth on the wheel $e$. Such a construction is shown in Fig. 5, wherein $g'$ is a bevel-pinion on spindle $g$, and $e'$ is a bevel-wheel, which takes the place of toothed wheel $e$. I prefer the screw or worm, as it occupies less space and secures a slower motion with a less amount of gearing.

I am well aware that an odometer to be secured to the non-rotative axle of a wagon or like vehicle has been provided with an operating-shaft bearing on its projecting end a "star-wheel," the points of which are in the path of projections on the wheel-hub. Such a device may be seen, for example, in the patent of Gillespie, No. 290,767, of December 25, 1883. This construction I do not claim. So far as I am aware, all of such mechanisms—that is, those which employ this means of converting continuous rotary into intermittent rotary motion—have differed from mine in several important respects. For example, my cyclometer is not mounted on a non-rotative axle, but is suspended from a rotating axle. In all previous constructions, also, the axis of the star-wheel has been arranged parallel with that of the vehicle-wheel, while in my construction these axes stand at right angles to each other. In my construction the mechanism is all housed and protected against dust or dangers, which has not been the case with constructions heretofore.

Having thus described my invention, I claim—

1. The combination, in a gravity-cyclometer, of a registering mechanism inclosed in a case, a housing, $b$ $b'$, fixed to said case to embrace the axle of a bicycle-wheel, a weight attached to and suspended from said housing, a rotatively-mounted operating-spindle projecting from said case into said housing, said spindle having its axis arranged at right angles to the axis of said housing, a turnstile, $i$, mounted on the said spindle within said housing, and a stud to be carried by the axle of the wheel, also arranged within said housing, all arranged to operate substantially as and for the purposes set forth.

2. The combination with a bicycle-wheel, of a gravity-cyclometer comprising a registering mechanism inclosed in a case, a housing composed of two sections, $b$ $b'$, fixed to said case and adapted to loosely embrace the axle of the bicycle-wheel, a weight, $d$, attached to said housing to prevent the cyclometer from revolving with said wheel, an operating shaft or spindle projecting from said case into the cavity of the housing, a turnstile, $i$, carried by said operating-spindle, and a stud, $j$, on a sleeve mounted fixedly on the axle of the wheel within said casing, said operating-spindle and said axle having their axes arranged at right angles, and said turnstile being arranged in the path traveled by the stud $j$ as the axle revolves, substantially as set forth.

In witness whereof I have hereunto signed my name in the presence of two subscribing witnesses.

JOSEPH BUTCHER.

Witnesses:
 HENRY CONNETT,
 FRANK MOULIN.